United States Patent
Frydendal et al.

(10) Patent No.: US 10,837,493 B2
(45) Date of Patent: Nov. 17, 2020

(54) FLUID FILM BEARING FOR A WIND TURBINE

(71) Applicant: Siemens Gamesa Renewable Energy A/S, Brande (DK)

(72) Inventors: Niels Karl Frydendal, Herning (DK); Troels Kanstrup, Rask Moelle (DK); Dennis Olesen, Aarhus (DK); Kim Thomsen, Skørping (DK); Morten Thorhauge, Aarhus (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 0 days.

(21) Appl. No.: 16/130,506

(22) Filed: Sep. 13, 2018

(65) Prior Publication Data

US 2019/0085829 A1  Mar. 21, 2019

(30) Foreign Application Priority Data

Sep. 20, 2017 (EP) .................................. 17192106

(51) Int. Cl.
*F16C 32/06* (2006.01)
*F16C 17/03* (2006.01)
(Continued)

(52) U.S. Cl.
CPC .......... *F16C 32/0666* (2013.01); *F16C 17/03* (2013.01); *F16C 17/06* (2013.01);
(Continued)

(58) Field of Classification Search
CPC ........ F16C 17/03; F16C 17/035; F16C 17/06; F16C 17/065; F16C 32/0666;
(Continued)

(56) References Cited

U.S. PATENT DOCUMENTS 3,033,619 A * 5/1962 Ertl .......................... F16C 17/06
                                                       384/308
3,787,105 A * 1/1974 Gardner .................. F16C 17/03
                                                       384/312
(Continued)

FOREIGN PATENT DOCUMENTS

CN    101707409 A    5/2010
CN    102022425 A    4/2011
(Continued)

OTHER PUBLICATIONS

European Search Report for Application No. 17192106.7, dated Apr. 13, 2018.
(Continued)

*Primary Examiner* — James Pilkington
(74) *Attorney, Agent, or Firm* — Schmeiser, Olsen & Watts LLP

(57) ABSTRACT

A fluid bearing for a wind turbine includes: a bearing housing, a plurality of bearing pads inside the bearing housing and circumferentially distributed around a longitudinal axis of the fluid bearing, a plurality of supporting structures, each supporting structure having at least a first interface detachably connected to a respective seat provided in the bearing housing and at least a second interface detachably connected to a respective bearing pad of the plurality of bearing pads, each supporting structure allowing tilting of the respective bearing pad with respect to the bearing housing.

14 Claims, 4 Drawing Sheets

(51) Int. Cl.
*F16C 33/12* (2006.01)
*F16C 17/06* (2006.01)
*F16C 33/26* (2006.01)

(52) U.S. Cl.
CPC ............ *F16C 33/121* (2013.01); *F16C 33/26* (2013.01); *F05B 2240/53* (2013.01); *F16C 2208/32* (2013.01); *F16C 2360/31* (2013.01)

(58) Field of Classification Search
CPC .... F16C 33/121; F16C 33/26; F16C 2208/32; F16C 2360/31
See application file for complete search history.

(56) References Cited

U.S. PATENT DOCUMENTS

| | | | |
|---|---|---|---|
| 5,743,657 A * | 4/1998 | O'Reilly | F16C 17/03 384/312 |
| 5,803,614 A | 9/1998 | Tsuji et al. | |
| 9,297,363 B2 * | 3/2016 | Guerenbourg | F16C 35/02 |
| 9,587,672 B1 * | 3/2017 | Rockefeller | F16C 17/03 |
| 2010/0034492 A1 | 2/2010 | Krumme | |
| 2011/0069915 A1 | 3/2011 | Palomba et al. | |
| 2012/0099993 A1 | 4/2012 | Guerenbourg et al. | |
| 2013/0216169 A1 * | 8/2013 | Zidar | F16C 33/121 384/276 |
| 2017/0045082 A1 | 2/2017 | Rockefeller et al. | |

FOREIGN PATENT DOCUMENTS

| | | | |
|---|---|---|---|
| EP | 2840267 A | | 2/2015 |
| FR | 2260710 | * | 2/1974 |
| GB | 2292192 A | | 2/1996 |
| JP | 59093513 | * | 5/1984 |
| WO | 2011003482 A2 | | 1/2011 |
| WO | 2017027537 A1 | | 2/2017 |

OTHER PUBLICATIONS

Chinese Office Action for Application No. 201811100192.8, dated Nov. 22, 2019.

* cited by examiner

FLUID FILM BEARING FOR A WIND TURBINE

CROSS-REFERENCE TO RELATED APPLICATIONS

This application claims priority to European application No. EP17192106, having a filing date of Sep. 20, 2017, the entire contents of which are hereby incorporated by reference.

FIELD OF TECHNOLOGY

The following relates to a fluid film bearing for a wind turbine.

BACKGROUND

In the above described technical field, fluid film bearings, also known as fluid bearing, are used to support a rotating shaft. Fluid film bearing typically comprises a plurality of bearing pads radially distributed around the axis of rotation of the rotating shaft. The fluid film supporting the shaft is formed between the shaft itself and the bearing pads. For each bearing pad a supporting structure is interposed between the pad and a bearing housing.

Compared with classic application of fluid film bearings such gas and steam turbines, cement mills, ship propulsion and others, the loadings in wind turbine has a high dynamic characteristic, i.e. the loading acting on the bearing has a great variability. This is combined with the fact that due to weight and cost limitations in wind turbines, bearing housings must be much lighter and thereby fare more flexible than what seems to be the trend in the before mentioned applications.

The combination of the flexible structure and dynamic loading leads to a plurality of different challenges. In particular, the pads supporting structure, which is normally not a critical component in other fluid film bearings application, in wind turbines exhibits a plurality of problems. Among them there is the problem of correct alignment of the bearing pad with respect to the rotating shaft. A further problem is the the fretting wear between the pad supporting structure and the bearing housing. Fretting wear is a type of wear which occurs under load between surfaces in minute relative motion. Fretting wear has to be avoided or limited, since the bearing housing cannot be replaced on a wind turbine. Another inconvenience in known fluid film bearings is that replacement of the pad supporting structures, in case of excessive wear or for other reasons, is normally not easy.

There may be therefore still a need for providing a new fluid film bearings with improved characteristics with respect to the known art, in particular as far as alignment of the bearing pad and easy replacement of the pad supporting structures are concerned. Further, it is desirable to reduce the fretting wear, with respect to existing fluid film bearings.

SUMMARY

An aspect relates to providing a fluid bearing for a wind turbine comprising:
  a bearing housing,
  a plurality of bearing pads inside the bearing housing and circumferentially distributed around a longitudinal axis of the fluid bearing,
  a plurality of supporting structures, each supporting structure having at least a first interface detachably connected to a respective bearing pad of the plurality of bearing pads and at least a second interface detachably connected to a respective seat provided in the bearing housing,
  wherein the supporting structure allows tilting of the respective bearing pad with respect to the bearing housing.

Different supporting structures may be interposed between the bearing pad and the bearing houses, provided that they allow tilting of the respective bearing pad with respect to the bearing housing. This assures the correct alignment of the bearing pad. The detachable second interface allows substitution of the supporting structure. Advantageously, the supporting structure may eventually be substituted with another one, having a different type of first interface.

In embodiments of the present invention the anti-fretting at least an anti-fretting layer is interposed between the second interface and the respective seat.

Fretting between the pad support and the bearing house is prevented thanks to the anti-fretting layer(s).

Particularly the anti-fretting properties of the anti-fretting layer(s) can be efficiently achieved through anti-fretting layer comprising a composite material, more particularly a composite material including PTFE.

In embodiments of the present invention the anti-fretting layer is provided on a base surface of the supporting structure, the base surface being circumferentially oriented with respect to a longitudinal axis of the fluid bearing.

Alternatively or in addition to such position, the anti-fretting layer is provided on a lateral surface (of the supporting structure, the lateral surface being radially oriented with respect to a longitudinal axis of the fluid bearing.

In particular, anti-fretting layer(s) may be mounted on the supporting structure on all the surfaces which are in a steel-to-steel contact with the respective seat of the housing.

This protects the seat from wearing. Advantageously this permits, during the turbines life time, to change only the supporting structure(s), without having to change the entire bearing or the bearing housing.

In embodiments of the present invention the supporting structure may comprise a tilting joint between the respective bearing pad and the bearing housing. In other embodiments the supporting structure may comprise a spheroidal joint between the respective bearing pad and the bearing housing.

Advantageously this permits, during the turbines lifetime, to change the supporting structure(s), and at same time choosing also another kind of joint, changing for example from the tilting joint to the spheroidal joint or to a third one. This is possible because the housing interface(s) determined by the seat(s) in the bearing houses are the same in all cases and because embodiments of the present invention preserves them from wearing. Many design uncertainties, when using fluid film bearings in wind turbines, lies in the supporting structure. Advantageously, the fluid bearing can be simply and easily rebuilt and reconfigured with new features, i.e. the type of joint between the pads and the bearing housing, on site.

According to other embodiments of the invention, the supporting structure includes a hardened insert for transferring a bearing load between the respective bearing pad and the bearing housing. In particular, the supporting structure may include a hardened insert at least partially interposed between the respective bearing pad and the bearing housing and an interface block at least partially interposed between the respective hardened insert and the bearing housing. Advantageously, this permits decoupling of radial loads and easy manufacturing.

In particular, the hardened insert allows for easier and cheaper manufacturing. In a possible embodiment of the present invention, the hardened insert is constituted by a cylindrical bar having an axis radially disposed with respect to the longitudinal axis of the fluid bearing. Such a bar is a common delivery from steel suppliers without needed for special forge tools.

Further advantageously, the radial loads from the pad can be totally decoupled from the interface block, which means that the radial loads are transferred directly from the pad directly to the bearing housing, through the hardened insert. This means that the design of the interface block has lower specifications in terms of strength and fatigue.

Anti-fretting layer may be provided on the hardened insert and/or on the interface block. This protects the seat from wearing on all the surfaces which are in a steel-to-steel contact with the supporting structure.

According to an embodiment of the invention, an elastomer layer is provided between the hardened insert and the interface block.

Advantageously, this ensures that a load is always present on the hardened insert, also in the event of a change in the load direction, thus preventing rattling and wear of the hardened insert.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
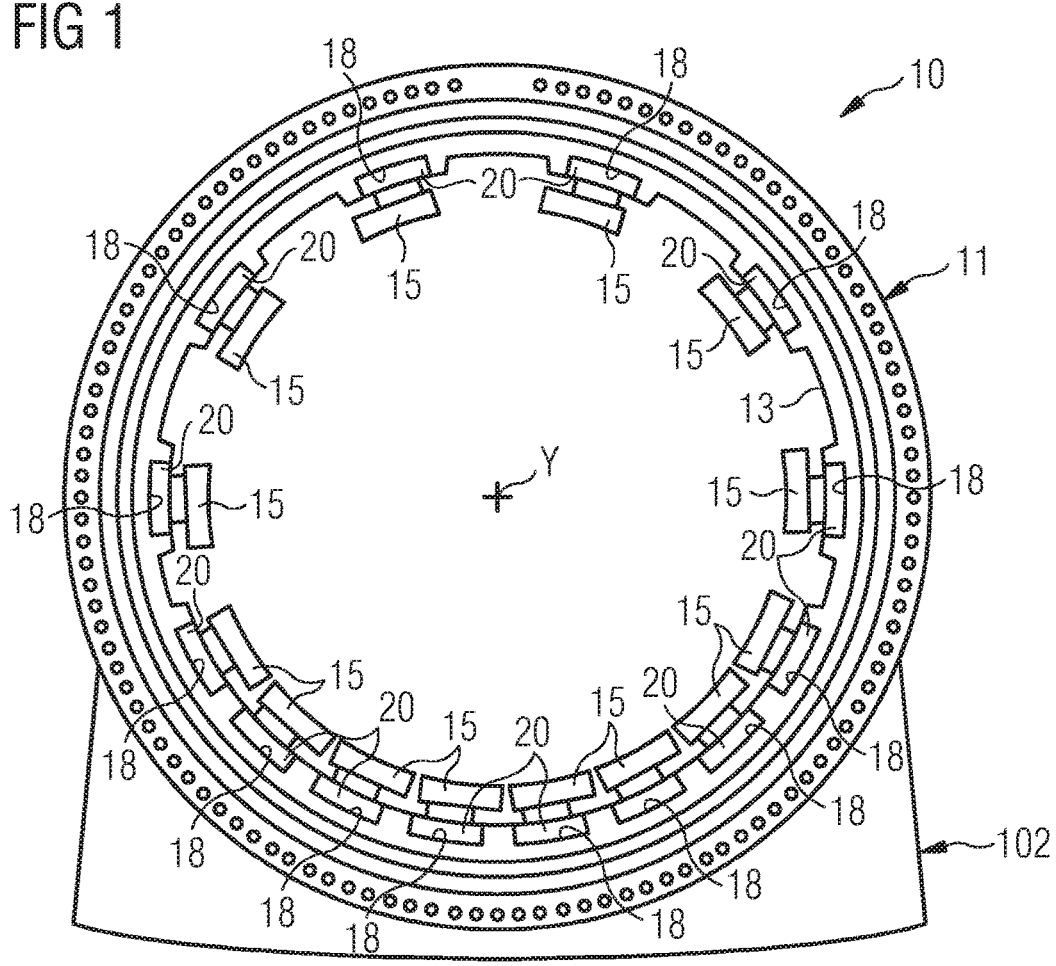
FIG. 1 shows a schematic sectional view fluid film bearing for a wind turbine.

The illustrations in the drawings are schematic. It is noted that in different figures, similar or identical elements or features are provided with the same reference signs. In order to avoid unnecessary repetitions elements or features which have already been described with respect to an embodiment are not described again further in the description.

FIG. 1 partially shows a fluid bearing 10 for a wind turbine (not represented as a whole). The fluid bearing 10 includes a stator portion 10a and a rotor portion (not shown as not being a specific object of embodiments of the present invention), typically a shaft, rotating with respect to the stator portion 10a around a longitudinal axis Y of the fluid bearing.

In the following the terms "longitudinal", "radial" and "circumferential" are referred, when not differently specified, to the longitudinal axis Y of the fluid bearing 10.

The stator portion 10a comprises a plurality of bearing pads 15. In operation of the fluid bearing 10, a thin layer of rapidly moving pressurized liquid or gas is established between the rotor portion and the bearing pads 15. The lack of contact between the moving parts implies that there is no sliding friction, reducing wear and vibration with respect to other types of bearings. How such this thin fluid layer is established is not a specific object of embodiments of the present invention and therefore not described in further detail.

The fluid bearing 10, in the stator portion 10a, includes a bearing housing 11 having a hollow shape circumferentially distributed around the longitudinal axis Y.

The bearing housing 11 comprises an inner surface 13 longitudinally extended. The plurality of bearing pads 15 are provided inside the bearing housing 11, protruding radially from the inner cylindrical surface 13 towards the longitudinal axis Y. The bearing pads 15 are circumferentially distributed around the longitudinal axis Y. The distribution is not regular but takes into account that on a lower portion of the bearing housing 11, due to the gravity, the load is greater. Therefore, with reference to FIG. 1, which represents a vertical sectional view of the fluid bearing 10 in operative position, two bearing pads 15 are provided on a horizontal plane including the longitudinal axis Y, four bearing pads 15 are provided on an upper portion of the bearing housing 11 above the horizontal plane including the longitudinal axis Y and eight bearing pads 15 are provided on an lower portion of the bearing housing 11 below the horizontal plane including the longitudinal axis Y.

According to other possible embodiments of the present invention, a different number and a different distribution of the plurality bearing pads 15 may be implemented.

For each of the bearing pads 15, the fluid bearing 10 includes a supporting structure 20 for connecting the respective bearing pad 15 to the bearing housing 11.

Each supporting structure 20 comprises a first interface 21 detachably connected to a respective seat 18 provided in the bearing housing 11.

The seat 18 is a radial recess provided on the inner surface 13 of the bearing housing 11 and has the shape of a parallelepiped having an opening on the inner surface 13, a plane base opposite to the opening and four plane lateral surfaces connecting the plane base to the opening.

The plane base of the seat 18 is orthogonal to a radial direction the fluid bearing 10. The four plane lateral surfaces of the seat 18 are orthogonal to a circumferential direction the fluid bearing 10, i.e. practically almost oriented according to a radial direction of the fluid bearing 10.

Consequently, the first interface 21 as a parallelepiped shape for matching the radial recess of the seat 18. The supporting structure 20 comprises a base surface 31 which in operation, i.e. when the supporting structure 20 is connected to the bearing housing 11, is adjacent to the plane base of the seat 18, i.e. orthogonal to a radial direction of the fluid bearing 10. The supporting structure 20 further comprises four lateral surfaces 32, 33, 34, 35 which in operation are adjacent to the four plane lateral surfaces of the seat 18, i.e. orthogonal to a circumferential direction of the fluid bearing 10.

An anti-fretting layer 30 is interposed between the first interface 21 and the respective seat 18. The anti-fretting layer 30 is a layer of composite material including PTFE.

According to other embodiments of the present invention, any other material exhibiting anti-fretting properties may be used.

The anti-fretting layer 30 is provided on one or more of the base surface 31 and the lateral surfaces 32, 33, 34, 35.

Figure 5:
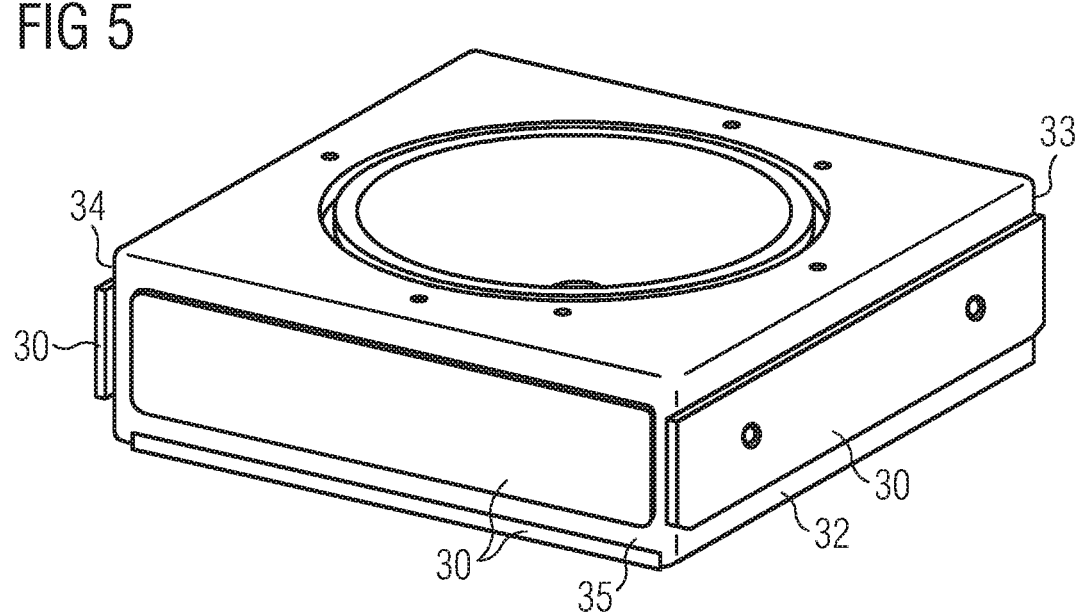
FIG. 5 shows an axonometric view of a component of the fluid film bearing of FIG. 1.

FIG. 5 shows an axonometric view of the first interface 21 in the form of a parallelepiped block including the base surface 31 and the lateral surfaces 32, 33, 34, 35.

Preferably, as shown in the embodiment of FIG. 5, anti-fretting layers 30 are provided on all the base surface 31 and the lateral surfaces 32, 33, 34, 35.

Figure 2:
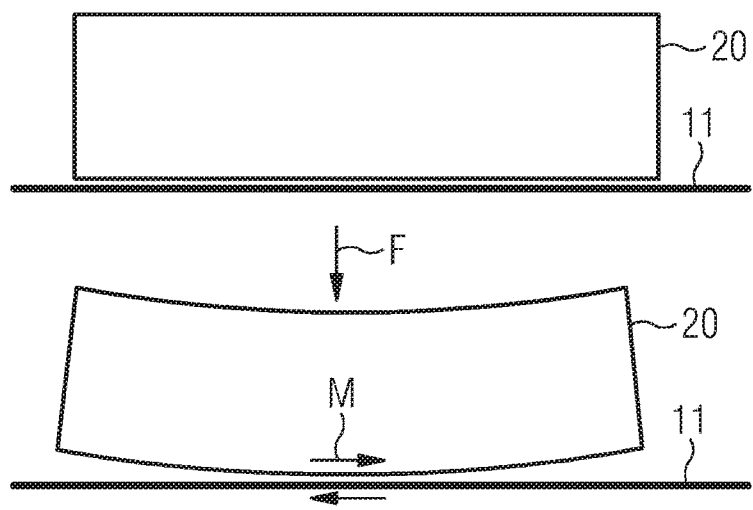
FIG. 2 shows a scheme clarifying operational aspects of components of a fluid film bearing for a wind turbine.

In operation, dynamic loads acting on the pads combined with flexibility of the bearing housing 11 determines relative movement between the supporting structure 20 and the bearing housing 11. As schematically shown in FIG. 2, when the supporting structure 20 is loaded with the radial force F it bends, thus causing relative movement M between the bearing housing 11 and the supporting structure 20.

The presence of the fretting layers 30 prevents wearing to occur between the first interface 21 and the seat 18.

The first interface 21, together with the fretting layers 30, as shown in FIG. 5 provides a standard interface which is shared by different embodiments of the supporting structure 20, meaning that different embodiments of the supporting structure 20 can be coupled to the seat 18, independently from a second interface 22 provided in the supporting structure 20 and detachably connected to a respective bearing pad 15. The second interface 22 is provided in the supporting structure 20 radially opposite to the first interface 21.

Figure 3:
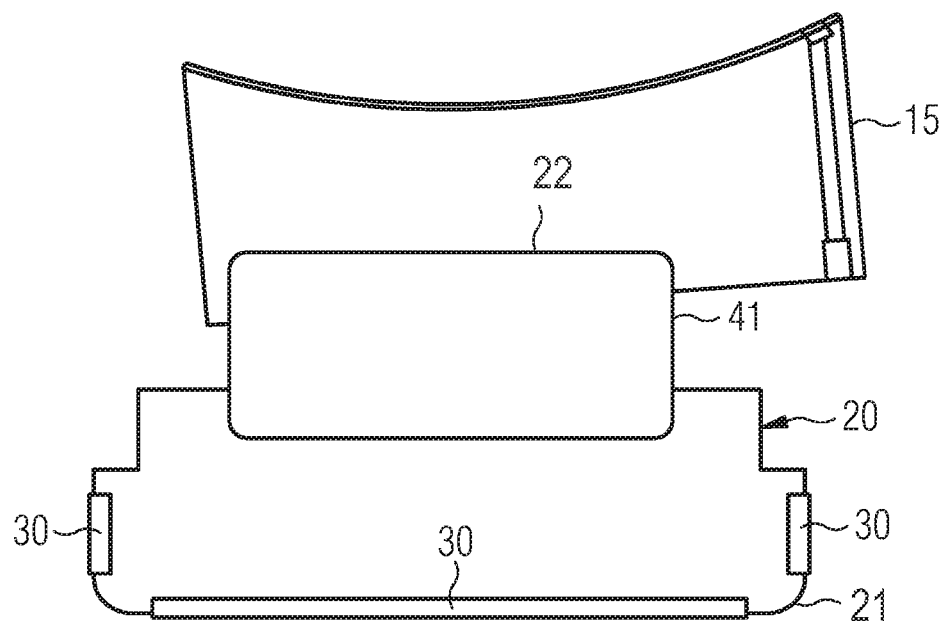
FIG. 3 shows a schematic sectional view of a first embodiment for a component of the fluid film bearing of FIG. 1.

With reference to FIG. 3, a first embodiment of the first interface 21 is shown. Such interface comprises a tilting joint 41 between the respective bearing pad 15 and the bearing housing 11. More in particular the tilting joint 41 is provided between the respective bearing pad 15 and the parallelepiped block which comprises the first interface 21.

The tilting joint 41 allows tilting of the respective bearing pad 15 around a tilting axis parallel oriented with respect to the longitudinal axis Y.

Figure 4:
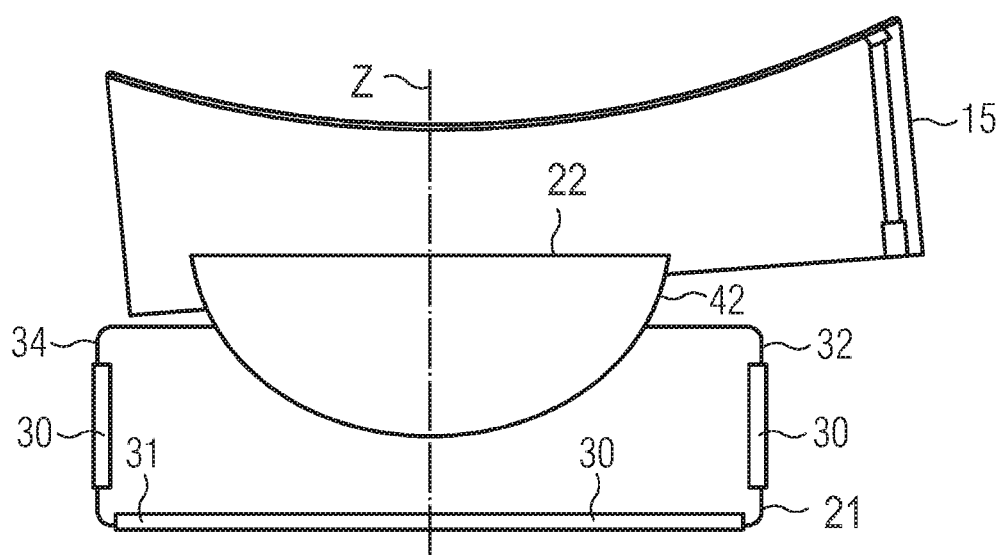
FIG. 4 shows a schematic sectional view of a second embodiment for the component of the fluid film bearing of FIG. 1.

With reference to FIG. 4, a second embodiment of the first interface 21 is shown. Such interface comprises a spheroidal joint (also called ball and socket joint) 42 between the respective bearing pad 15 and the bearing housing 11. More in particular the spheroidal joint 42 is provided between the respective bearing pad 15 and the parallelepiped block which comprises the first interface 21.

The spheroidal joint 42 has a radial symmetry axis Z, i.e. an axis orthogonally oriented with respect to the longitudinal axis Y of the fluid bearing 10.

The tilting joint 41 and the spheroidal joint 42 are conventional components, which are not specifically part of embodiments of the present invention and therefore not described in further detail. Embodiments of the present invention, by providing a standard interface which is shared by different embodiments of the supporting structure 20 and which has anti-fretting properties, allows changing supporting structure 20 in the same fluid bearing 10, in particular by changing a supporting structure 20 having a tilting joint 41 with a supporting structure 20 having a spheroidal joint 42 or vice versa.

Figure 6:
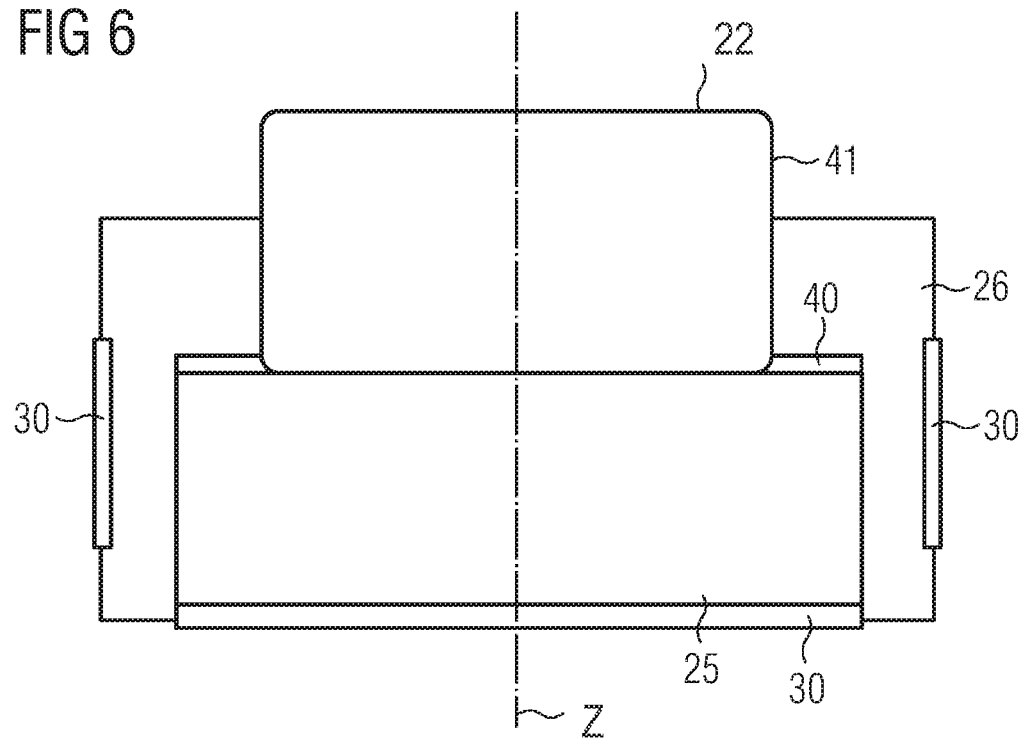
FIG. 6 a schematic sectional partial view of a third embodiment for the component of the fluid film bearing of FIG. 1.

With reference to FIG. 6, an alternative embodiment of a supporting structure 20 including a tilting joint 41 is shown. In particular, an alternative to a supporting structure 20 having a first interface 21 in the form of a single parallelepiped block (FIG. 5) is shown. In the embodiment of FIG. 6 the supporting structure 20 includes a hardened insert 25 for transferring a bearing load between the respective bearing pad 15 and the bearing housing 11. The hardened insert 25 is constituted by a cylindrical bar having an axis Z radially disposed with respect to the longitudinal axis Y of the fluid bearing 10. The hardened insert 25 is interposed between the respective bearing pad 15 and the bearing housing 11 and includes the base surface 31 on which an anti-fretting layer 30 is provided. The radial loads from the respective bearing pad 15 are transferred directly from the bearing pad 15 directly to the bearing housing 11 through the hardened insert 25. In such embodiment the supporting structure 20 further includes an interface block 26 interposed between the respective hardened insert 25 and the bearing housing 11 and includes the lateral surfaces 32, 33, 34, 35 on which respective anti-fretting layers 30 are provided.

An elastomer layer 40 is optionally provided between the hardened insert 25 and the interface block 26, for ensuring that a load is always present on the hardened insert 25, also in the event of a change in the radial load direction.

Figure 7:
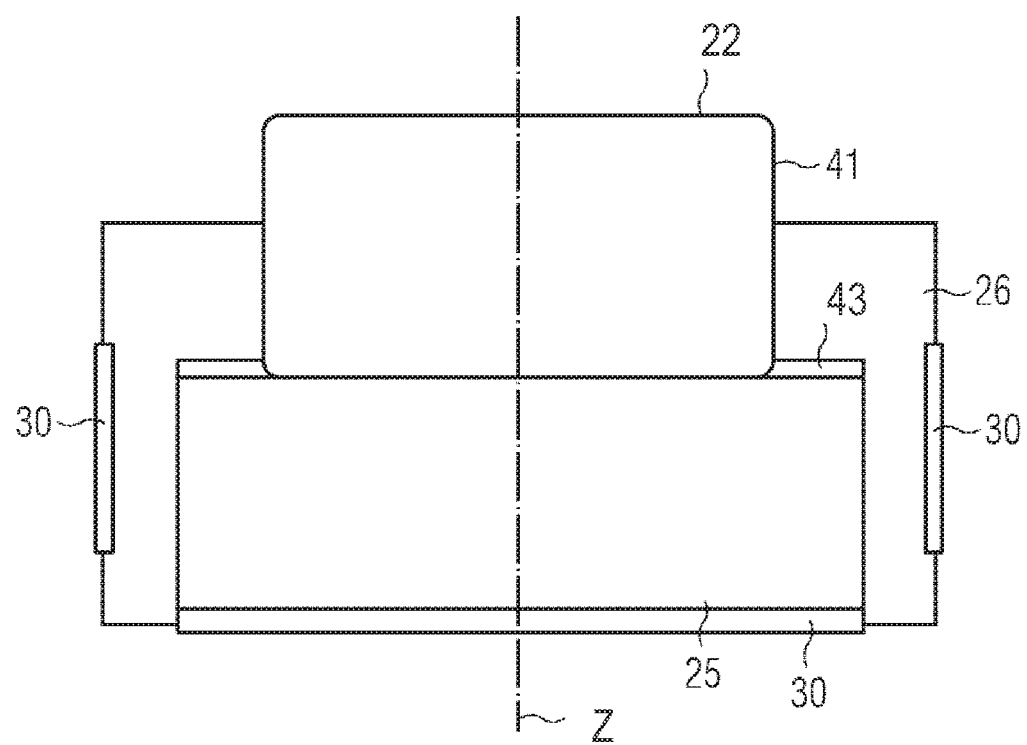
FIG. 7 shows an elastic element between a hardened insert and an interface.

According to other embodiments of the present invention any other type of elastic element 43 (in FIG. 7) may be used, for ensuring that a load is always present on the hardened insert 25.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A fluid bearing for a wind turbine comprising:
a bearing housing,
a plurality of bearing pads inside the bearing housing and circumferentially distributed around a longitudinal axis of the fluid bearing,
a plurality of supporting structures, each supporting structure having at least a first interface detachably connected to a respective seat provided in the bearing housing and at least a second interface detachably connected to a respective bearing pad of the plurality of bearing pads,
wherein each supporting structure allows tilting of the respective bearing pad with respect to the bearing housing, wherein an anti-fretting layer is provided on a lateral surface of each supporting structure, wherein the anti-fretting layer on the lateral surface is in contact with the respective seat, the lateral surface being orthogonal to a circumferential direction of the fluid bearing.

2. The fluid bearing of claim 1, wherein a further anti-fretting layer is interposed between the first interface and the respective seat.

3. The fluid bearing of claim 1, wherein a further anti-fretting layer is provided on a base surface of the each supporting structure, the base surface being substantially orthogonal to a radial direction the fluid bearing.

4. The fluid bearing of claim 1, wherein a plurality of anti-fretting layers are provided on the lateral surface of the each supporting structure.

5. The fluid bearing of claim 1, wherein each supporting structure comprises a tilting joint between the respective bearing pad and the bearing housing.

6. The fluid bearing of claim 5, wherein the tilting joint has a tilting axis parallel oriented with respect to the longitudinal axis of the fluid bearing.

7. The fluid bearing of claim 1, wherein the each supporting structure comprises a spheroidal joint between the respective bearing pad and the bearing housing.

8. The fluid bearing of claim 7, wherein the spheroidal joint has a symmetry axis orthogonally oriented with respect to the longitudinal axis of the fluid bearing.

9. The fluid bearing of claim 1, wherein the anti-fretting layer includes a composite material.

10. The fluid bearing of claim 9, wherein the anti-fretting layer includes PTFE.

11. A fluid bearing for a wind turbine comprising:
a bearing housing,
a plurality of bearing pads inside the bearing housing and circumferentially distributed around a longitudinal axis of the fluid bearing,
a plurality of supporting structures, each supporting structure having at least a first interface detachably connected to a respective seat provided in the bearing housing and at least a second interface detachably connected to a respective bearing pad of the plurality of bearing pads, wherein each supporting structure allows tilting of the respective bearing pad with respect to the bearing housing, wherein each supporting structure includes an insert for transferring a bearing load between the respective bearing pad and the bearing housing and wherein the insert is a cylindrical bar having an axis radially disposed with respect to the longitudinal axis of the fluid bearing, wherein at least an anti-fretting layer is provided on the insert.

12. The fluid bearing of claim 11, wherein each supporting structure includes the insert at least partially interposed between the respective bearing pad and the bearing housing and an interface block at least partially interposed between the respective insert and the bearing housing.

13. The fluid bearing of claim 12, wherein at least an anti-fretting layer is provided on the interface block.

14. The fluid bearing claim 12, wherein an elastic element is provided between the insert and the interface block.

* * * * *